(12) United States Patent
Puranik

(10) Patent No.: US 7,852,757 B1
(45) Date of Patent: Dec. 14, 2010

(54) STATUS BASED DATA FLOW CONTROL FOR CHIP SYSTEMS

(75) Inventor: Kiran S. Puranik, Fremont, CA (US)

(73) Assignee: Xilinx, Inc., San Jose, CA (US)

( * ) Notice: Subject to any disclaimer, the term of this patent is extended or adjusted under 35 U.S.C. 154(b) by 74 days.

(21) Appl. No.: 12/401,032

(22) Filed: Mar. 10, 2009

(51) Int. Cl.
*G01R 31/08* (2006.01)

(52) U.S. Cl. ............... 370/229; 370/419; 370/412; 710/52

(58) Field of Classification Search .............. None
See application file for complete search history.

(56) References Cited

U.S. PATENT DOCUMENTS

| | | | |
|---|---|---|---|
| 6,298,040 | B1 | 10/2001 | Aoyagi et al. |
| 7,522,520 | B2* | 4/2009 | Griggs .................. 370/230 |
| 7,583,600 | B1* | 9/2009 | Schanke et al. ........... 370/235 |
| 7,694,025 | B1* | 4/2010 | Norrie ...................... 710/3 |
| 7,698,477 | B2* | 4/2010 | Breti et al. ............... 710/29 |
| 7,702,841 | B2* | 4/2010 | Shima .................. 710/310 |
| 2006/0050632 | A1* | 3/2006 | Griggs .................. 370/229 |
| 2006/0114918 | A1* | 6/2006 | Ikeda et al. ............. 370/408 |
| 2006/0239194 | A1* | 10/2006 | Chapell .................. 370/235 |
| 2007/0121495 | A1* | 5/2007 | Breti et al. .............. 370/229 |
| 2008/0184008 | A1* | 7/2008 | Zhu et al. ................. 712/29 |
| 2008/0276029 | A1* | 11/2008 | Haraden ................. 710/305 |
| 2009/0254692 | A1* | 10/2009 | Feehrer ................... 710/315 |
| 2009/0296740 | A1* | 12/2009 | Wagh et al. ............. 370/475 |

* cited by examiner

*Primary Examiner*—Bob A Phunkulh
(74) *Attorney, Agent, or Firm*—Scott Hewett; LeRoy D. Maunu (57) ABSTRACT

An integrated circuit ("IC") with a peripheral component interconnect express ("PCIe") has at least two data sinks (204, 206) and a data source (202) capable of providing data packets to either data sink. A switch (208) of the PCIe system includes a first buffer (226) queuing data packets for one of the data sinks and a second buffer (227) queuing data packets for the other data sink. A status detector (224) detects when the first buffer equals or exceeds a selected buffer threshold, and a status-based flow control transmitter (232) sends a data link layer packet ("DLLP") to the status-based flow control receiver (234) of the data source to cease transmitting first data packets while continuing to transmit second data packets.

19 Claims, 5 Drawing Sheets

FIG. 1

(Prior Art)

FIG. 2

| 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| | | | DLLP Type | | | | | | | Egress Port # | | | | | VLD | | R | | PTC | | PST | | NPTC | | | NPST | | CTC | | | CST | |
| DLLP CRC | | | | | | | | | | | | | | | | | | | | | | | | | | | | | | | | |

| Field | Description |
|---|---|
| DLLP Type | DLLP Encoding [0010 1000] |
| Egress Port # | Egress Port Number of the switch. Up to 32 PCIe ports (PCIe ports and on chip Integrated Endpoints). |
| VLD | Encoded information valid.<br>000 = No Valid Information<br>100 = Posted Only<br>010 = Non Posted Only<br>001 = Completion Only<br>110 = Posted + NP |
| R | Reserved |
| PTC | Posted Queue Traffic Class. For TC0-VC0 operation this field is always 0. |
| PST | Posted Queue Status. 00-XON, 01-short XOFF, 10-long XOFF, 11- Persistent XOFF. |
| NPTC | Non Posted Queue Traffic Class. For TC0-VC0 operation this field is always 0. |
| NPST | Non Posted Queue Status. 00-XON, 01-short XOFF, 10- long XOFF, 11-Persistent XOFF. |
| CTC | Completion Queue Traffic Class. For TC0-VC0 operation this field is always 0. |
| CST | Completion Queue Status. 00-XON, 01-short XOFF, 10-long XOFF, 11-Persistent XOFF |

STATUS BASED DATA FLOW CONTROL FOR CHIP SYSTEMS

FIELD OF THE INVENTION

This invention relates generally to integrated circuits, and more particularly to techniques for transferring data between peripheral components in an integrated circuit system.

BACKGROUND OF THE INVENTION

Computer systems have many protocols for transferring data between components. For example, a mother board of a computer system transfers data between the processor and peripheral components such as modems, memory, and disk drives. A common protocol used in computer systems is peripheral component interconnect ("PCI"), which is a data transfer technique using a parallel bus and common clock and control signals.

Another protocol is called PCI-express ("PCIe"), which is a serial data transfer technique. PCIe has been shown to provide fast, bidirectional data transfer without the need for a common clock on a reduced number of lines. PCIe is generally referred to as a link transaction that uses three layers. The transaction layer accepts and buffers data to create a T-layer packet ("TLP"). The TLP is provided to the data link layer, which provides the mechanisms for reliably exchanging TLPs between components and provides error detection and other functions. The processing in the data link layer is commonly referred to as data link layer processing, and produces a data link layer packet ("DLLP") that is, for example, a TLP with a packet sequence number prefix and error detection suffix, such as a cyclic redundancy code ("CRC"). The L-layer packet is provided to the physical layer, which frames and de-frames L-layer packets, and optionally provides additional functions, such as coding/decoding and scrambling/descrambling.

Some ICs, such as field-programmable gate arrays ("FPGAs") can operate as a computer system, with logic, memory, transceivers, and other components incorporated into a single chip. PCIe techniques can be used to transfer data between the components of the system on the chip. Conventional PCIe techniques use a credit-based flow control mechanism to insure packets aren't sent to a component unless that component is likely to be ready to accept them. Unfortunately, if a problem arises in one data flow path, it can affect another data flow path if certain types of components are common to both data flow paths. This is commonly called "congestion collapse".

SUMMARY OF THE INVENTION

Embodiments of the present invention allow for controlling data flow in a PCIe environment to avoid congestion collapse.

An integrated circuit ("IC") with a peripheral component interconnect express ("PCIe") has at least two data sinks and a data source capable of providing data packets to either data sink. A switch of the PCIe system includes a first buffer queuing data packets for one of the data sinks and a second buffer queuing data packets for the other data sink. A status detector detects when the first buffer equals or exceeds a selected buffer threshold, and a status-based flow control transmitter sends a data link layer packet ("DLLP") to the status-based flow control receiver of the data source to cease transmitting first data packets while continuing to transmit second data packets.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

Figure 1:
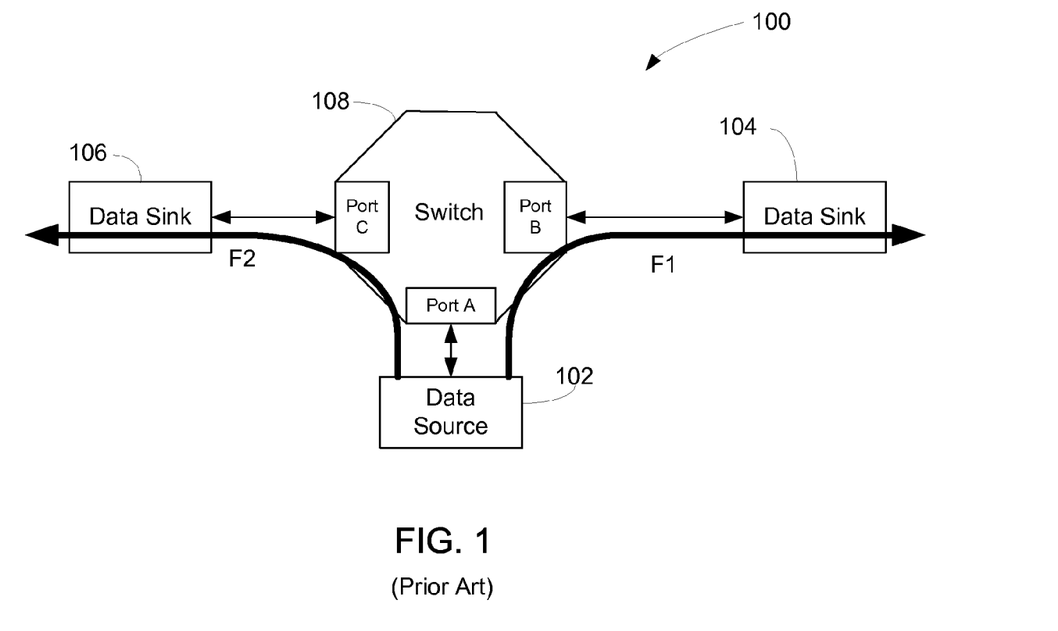
FIG. 1 is a diagram of a prior art PCIe system in an FPGA.

FIG. 1 is a diagram of a prior art PCIe system 100 in an FPGA. The PCIe system 100 has a first endpoint 102, which is a data source, a second endpoint 104, which is a data sink, a third endpoint 106, which is also a data sink, and a switch 108 having three ports A, B, C. The endpoints are line cards of a communication or computation platform, for example. A conventional PCIe technique uses credit-based flow control between endpoints, such as between the first endpoint 102 and the second endpoint 104 (flow path F1) and between the first endpoint 102 and the third endpoint 106 (flow path F2).

The credit-based flow control generally gates a transmitter (e.g., data source 102) based on available credits for transmission at an endpoint (e.g., data sink 106). An endpoint identifies an initial amount of credit for each of the receive buffers in its transaction layer to the source, and source sets a credit limit for that endpoint. The source counts the number of credits associated with each TLP it sends to the endpoint. The source only transmits a TLP to the endpoint when doing so would not result in credit count for that endpoint exceeding its credit limit. When the endpoint finishes processing the TLP from its buffer, it returns credits to the source, which then increases that endpoint's credit limit accordingly. Before transmitting a given TLP, the transmitter determines whether sufficient credits are available to permit transmission of the TLP to the receiver. If the receiver does not have enough credits to receive the TLP, the transmitter blocks the transmission of the TLP.

The credit-based flow control works well when the credit limits are not reached or when sufficient time has elapsed to clear buffers in the receiving device sufficiently to allow data flow to continue. However, congestion collapse can be a problem where these conditions are not met, and congestion collapse can be a particular problem for high-availability, fault-tolerant computation, and communication platforms, such as Internet protocol core router, aircraft flight control computer systems, and enterprise-grade servers, such as are used in banking and brokerage services. High-availability and fault-tolerant platforms often use multiple, independent systems that can be switched in the event that one of the systems fails; however, this is costly and consumes additional power. PCIe systems that are prone to congestion collapse reduces the applicability of ICs running those PCIe systems in high-availability or fault-tolerant applications. Thus, reducing the susceptibility of chip-based PCIe systems to congestion collapse increases the types of applications suitable for those ICs.

In a credit-based flow control system, a problem in the data flow path F2, such as the data sink 106 being unable to accept transaction layer data packets (TLPs) blocks the switch 108 from accepting data packets from the data source 102, even if those packets are designated to be sent to data endpoint 104. This shuts down the data flow path F1, even though data sink 104 is capable of accepting data. Thus, congestion on one flow path causes another flow path to collapse.

FPGAs are used on line cards of computation and communications systems. Line cards interface with external media, such as Ethernet, SONET, SAS, and SATA. These external media interfaces are more prone to exposure malfunctions during system operation, such as failed hard drives and severed cables. Therefore, FPGAs incorporating on-chip PCIe systems are particularly desirable.

Figure 2:
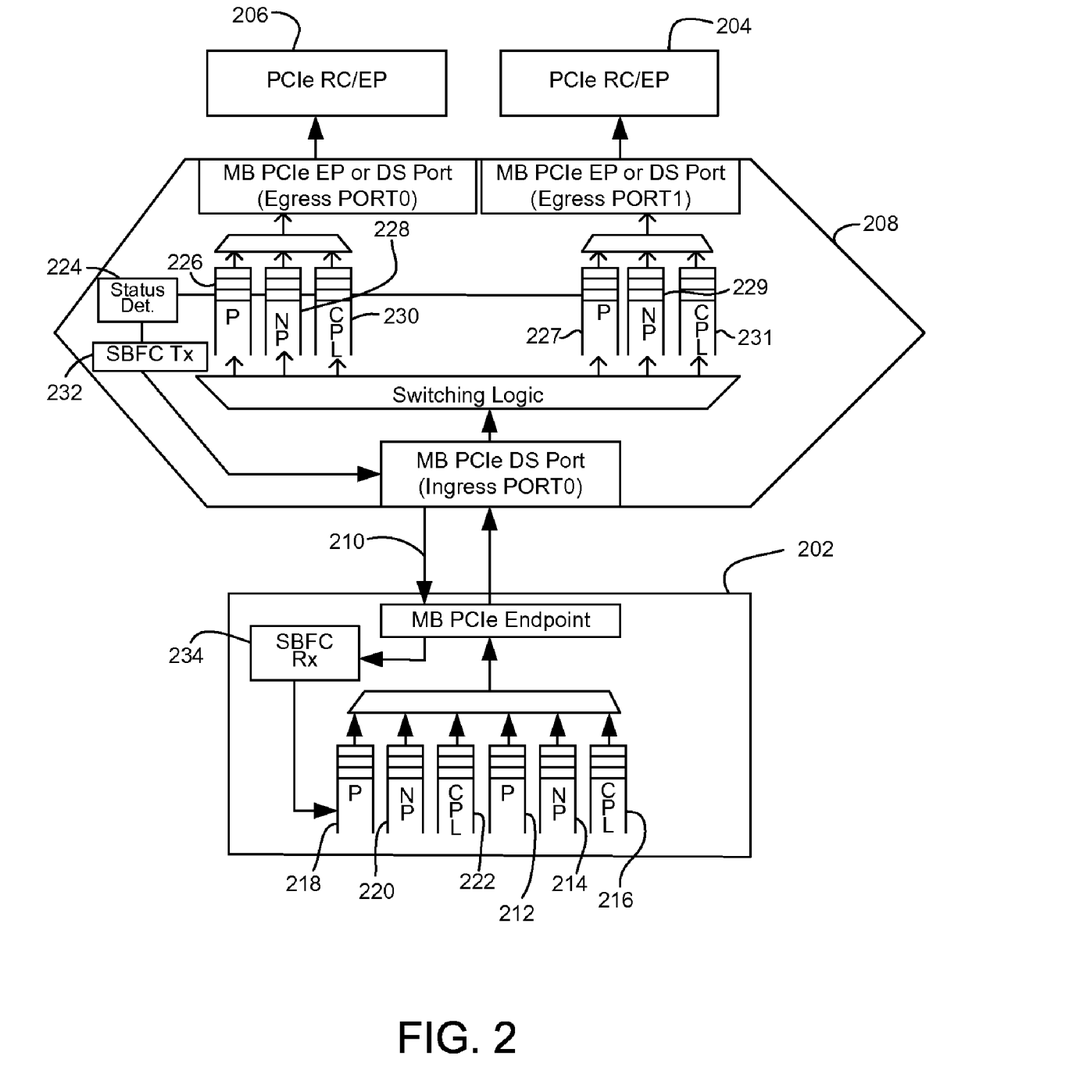
FIG. 2 is a diagram of a status-based flow control PCIe system according to an embodiment of the present invention.

FIG. 2 is a diagram of a status-based flow control PCIe system 200 according to an embodiment of the present invention. In a particular embodiment, the status-based flow control ("SBFC") PCIe system 200 is incorporated in an FPGA system, such as a VIRTEX2PRO™ FPGA, available from XILINX, INC., of San Jose, Calif. The system has a data source 202, a first data sink 204, a second data sink 206 and a switch 208. However, the switch 208 and the data source 202 include respective portions of an SBFC feedback path 210 that operates in conjunction with the standard PCIe credit-based flow control system.

The SBFC system operates at the DLLP level. The terms "data source", "data sink", "transmitter", "receiver", and similar terms are used merely for purposes of convenient discussion. Those of skill in the art understand that some components might operate as a data source for a first transaction, and as a data sink for a second transactions, or that a component that operates as a receiver might transmit data regarding buffer status, for example.

The data source 202 provides data designated for both data sinks 204, 206. The switch 208 accepts data/packets (TLPS and DLLPs) from the data source 202, which has sorted data packets into DLLPs according to their intended destination. A first set of buffers in the data source 202 includes a buffer 212 for posted packets, a buffer 214 for non-posted packets, and a buffer 216 for completed packets destined for the first data sink 204. A second set of buffers in the data source 202 includes a buffer 218 for posted packets. SBFC information is communicated for the posted, non-posted, and completion queues. A buffer 220 for non-posted packets, and a buffer 222 for completed packets destined for the second data sink 206. Those of skill in the art of PCIe DLLP techniques understand that the switches alternatively support additional endpoints. The use of posted, non-posted, and completed buffers in data link layer transactions are well known in the art, and a more detailed explanation is therefore omitted.

The SBFC feedback path 210 has a flow path status detector 224 that detects whether a problem exists in the data flow path F2 from the data source 202 and the data sink 206. Alternatively, the SBFC system also detects whether problems exist in the data flow path between the data source 202 and the data sink 204. In a particular embodiment, the data flow path F1 between the data source 202 and the data sink 204 is a high availability, fault tolerant, or other high value data flow path that the system designer desires to maintain open, and not to fail due to congestion collapse if the other data path(s) from the data source fail.

The credit-based flow control inherent in a PCIe environment is active, but could cause congestion collapse if a data flow path fails, such as if packets accumulate in the switch 208 faster than the data sink 206 can process them, which results in the credit count basically shutting down the data source 202. As explained above, and as is well known in the art of PCIe operation, the credit-based control operates in the transaction layer.

The SBFC system operates in the data link layer. In a particular embodiment, the flow path status detector monitors one or more of the egress buffers 226, 228, 230 holding packets destined for data sink 206, or one or more of the egress buffers 227, 229, 231 holding packets destined for data sink 204. The egress buffers hold posted, non-posted, and completed data, similar to corresponding buffers in the data source. Posted and completed data is temporarily buffered in the event that a packet needs to be re-sent in response to a transaction fault. In a particular embodiment, the flow path status detector monitors the non-posted buffer 228 and is enabled if the non-posted buffer fill exceeds a pre-selected limit. The buffer queue limit (i.e., how much of the buffer is loaded) is generally selected to insure that the SBFC system initiates before the credit-based flow control system.

If the buffer fill limit is equaled or exceeded, the flow path status detector 224 goes HIGH, causing a SBFC transmitter 232 to generate a DLLP that is sent back to the data source 202. A SBFC receiver 234 in the data source 202 reads the DLLP, which contains instructions for controlling the data source 202 to stop sending DLLPs destined for the data sink 206, but allowing the data source 202 to continue sending DLLPs to the data sink 204. After receiving the SBFC DLLP, the data source 202 stops sending packets destined to the endpoint 206. In some embodiments, the data source stops assembling packets destined for the data sink 206. Alternatively, the data source continues to assemble and load packets destined for data sink 206 until the non-posted buffer 220 achieves a pre-selected filled condition, or is entirely filled. Unlike the credit based flow control system, the SBFC system does not require data to be returned from the data sink 206. Flow control is based on the status of the switch 208. The SBFC system does not prevent packets from being sent from the switch 208 to the data sink 206, allowing the data sink 206 to continue processing data and clear the SBFC condition as long as the credit based flow control system allows.

When the SBFC condition is cleared (e.g., when the buffer queue of the non-posted buffer 228 has dropped below the threshold limit), the flow path status detector 224 goes LOW and the SBFC transmitter 232 sends another DLLP to the data source 202 indicating that the source can resume transmitting packets bound for data sink 206 to the switch 208. This resumption can occur with or without the native PCIe credit based flow control system being activated.

The SBFC initiates, stopping data flow along the selected path, before the credit based flow control initiates, preventing congestion collapse on the other data flow path(s). The SBFC limits are selected to avoid credit-based flow control restrictions on a first selected data flow path so that congestion collapse does not affect data flow on a second selected data flow path, even for data packets having the same traffic class.

The SBFC receiver 234 controls the data source 202, which is configured to operate in an SBFC PCIe system according to an embodiment. Some conventional data sources will not operate in an SBFC PCIe environment because they lack the ability to hold DLLPs destined for one endpoint while continuing to process and transmit DLLPs destined for another endpoint. In some embodiments, otherwise conventional data sources configured in an FPGA are modified by configuring the fabric of the FPGA to include the ability operate in an SBFC PCIe environment. Thus, SBFC PCIe techniques are particularly desirable in configurable IC applications, such as FPGAs and CLDs because existing components can be modified to operate in an SBFC environment. SBFE PCIe techniques are also desirable in IC systems that are designed with SBFC PCIe compatible endpoints.

In a particular embodiment, the switch 208 does not differentiate between traffic classes of transaction layer packets. In an alternative embodiment, packets in the switch 208 are differentiated according to a traffic class incorporated in a header, prefix, or suffix of the packet. For example, the packets destined for data sink 204 may include a high traffic class designator and the packets destined for data sink 206 may include a low traffic class designator or no traffic class designator. A switch that differentiates traffic based on transaction layer packet traffic class labels, switch egress ports can have separate hardware paths for different traffic classes or posted/non-posted/completed queue lengths per traffic class. Similarly, SBFC information may be returned per port for queues within a traffic class.

A traffic class ("TC") is a tag that resides on a TLP. TCs ride on hardware elements commonly known as virtual channels ("VCs"). A VC consists of a set of FIFOs for Posted, Non-Posted and Completion TLPs. A port can support multiple VCs and contains a TC/VC map. Hardware looks at the TLP TC tag and steers it to the appropriate VC based on the TC/VC map. An SBFC technique according to an embodiment supports ports that support multiple VCs.

In a particular embodiment of an SBFC PCIe system in an FPGA, the threshold value(s) of the flow status detector are user-selectable. In some embodiments, the user selects the threshold condition when initially configuring the FPGA. In a further embodiment, the status detector detects buffer conditions across a plurality of buffers associated with a first type (destination) of data packet, and in a further or alternative embodiment, the status detector detects a buffer condition in one or more buffers associated with a second type (destination) of data packets, as illustrated by the line extending from the status detector 224 across first buffers 226, 228, 230 to second buffer P on Egress PORT1.

Figure 3A:
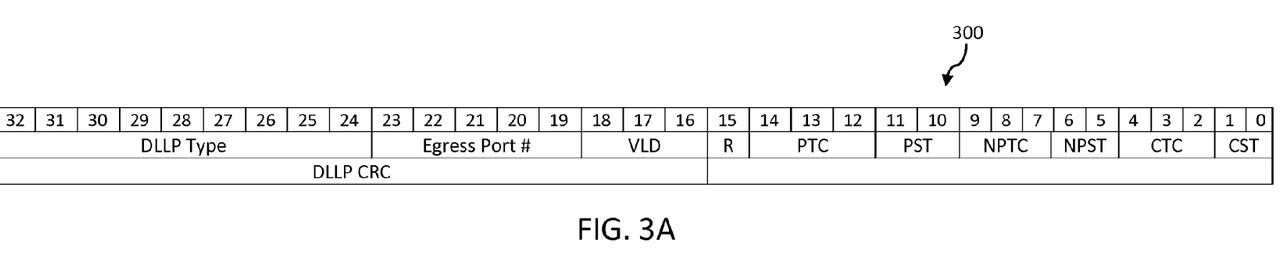
FIG. 3A is a representation of an SBFC DLLP 300 according to an embodiment of the present invention.

FIG. 3A is a representation of an SBFC DLLP 300 according to an embodiment. The SBFC DLLP is a 32-bit packet that is generated by the SBFC transmitter and sent to the SBFC-enabled data source (see, FIG. 2, ref. nums. 202, 232). The total number of available bits is typically limited by the PCIe specification. The DLLP type is a customized payload that instructs an SBFC PCIe-enabled peripheral component to operate according to the SBFC system definition. For example, in the system of FIG. 2, the DLLP type instructs the data source 202 to cease sending packets destined for data sink 206 to the switch 208, or to resume sending packets when the SBFC control condition has cleared.

Figure 3B:
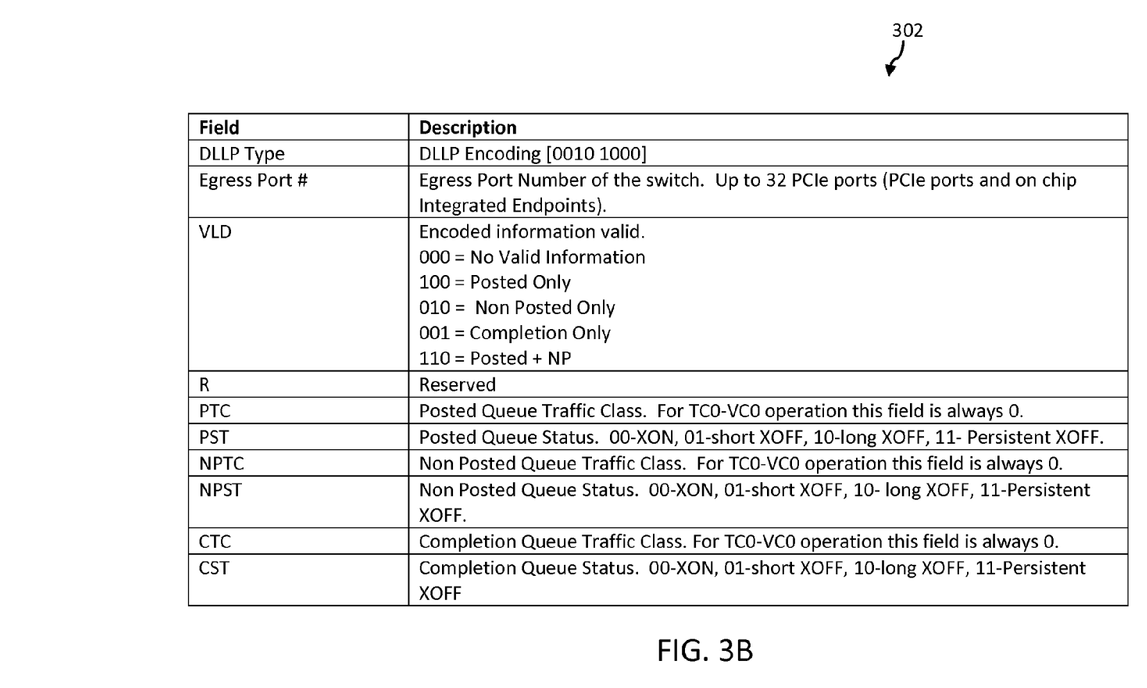
FIG. 3B is a chart showing the fields of the DLLP of FIG. 3A.

FIG. 3B is a chart 302 showing the fields of the DLLP of FIG. 3A. The DLLP of FIG. 3A is merely exemplary, and packets in alternative embodiments have more or fewer of bits or the arrangement of bits in the packet is different than the example in FIG. 3A. The DLLP type encoding is generally a customized payload according to the PCIe-enabled peripheral component to which it is sent and a cycle redundancy code ("CRC") for error checking. In a particular embodiment, a switch supports up to 32 PCIe ports and on-chip integrated endpoints. The Egress Port # identifies the proper egress port about with the information is being exchanged. The VLD bits indicate information that is valid, e.g. Posted only and Non Posted only. The R bit is reserved as a spare bit. For TC0-VC0 operation the posted queue traffic class ("PTC") bits are always zero. The posted queue status ("PST") bits (XON, Short XOFF, Long XOFF, Persistent XOFF) allow the transmitter to modulate traffic where XON turns on traffic and Short/Long/Persistent XOFF turns off traffic. For TC0-VC0 operation, the NPST field is also always zero. The completion queue traffic class ("CTC") field is always zero for TC0-VC0 operation. The completion queue status ("CST") bits indicate whether the traffic flow is ON or OFF.

SBFC DLLP priority of scheduled transmission is similar to PCIe Base Specification v2.0 recommended for flow control ("FC") DLLP transmissions. If an SBFC DLLP is scheduled for transmission at the same time as a CBFC DLLP, such as when independent hardware entities are computing the need to transmit CBFC, SBFC DLLPs, then the SBFC DLLP gets higher priority and will be transmitted before the CBFC. In such an instance, CBFC should not become active on the port with a properly designated SBFC, thus avoiding congestion collapse on other ports.

Figure 4:
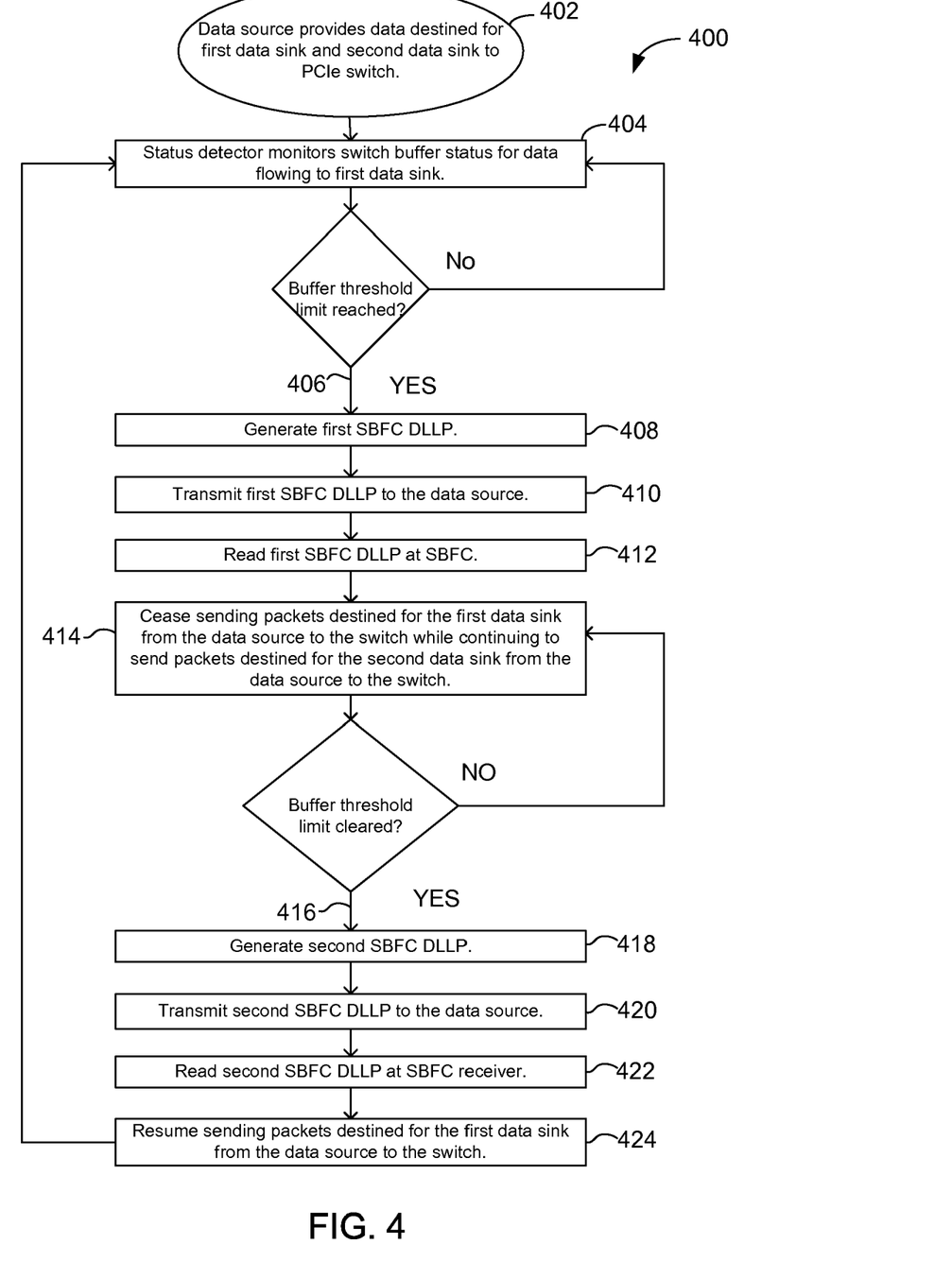
FIG. 4 is a flow chart of a method of controlling data flow from a data source in a PCIe system according to an embodiment of the present invention.

FIG. 4 is a flow chart of a method 400 of controlling data flow from a data source in a PCIe system according to an embodiment. The data source provides data destined for each of two endpoints to a switch (step 402). A status detector in the switch monitors a switch buffer status condition relating to data flow from the switch to a first data sink (step 404). When a buffer threshold limit is reached or exceeded (branch 406) a SBFC transmitter generates a DLLP (step 408) that is sent to the data source (step 410), while the switch continues to send data to the first data sink. In a particular embodiment where a credit based flow control instruction is scheduled to be sent to the data source, the SBFC DLLP is given priority. CBFCs are periodically sent, and if congestion has not yet occurred, only conveys the OPEN state of the receiver to the source, since the credits are not yet exhausted. The transmitted SBFC insures that the source of the traffic is notified in sufficient time to stop transmitting, which prevents the receiver from clogging up.

An SBFC receiver in the data source reads the SBFC DLLP (step 412), which contains instructions for the data source to cease sending packets destined for the first data sink to the switch, but to continue sending packets destined for a second data sink to the switch (step 414). In a further embodiment, the instructions cause the data source to cease assembling packets for the first data sink. In an alternative embodiment, the data source continues assembling and buffering packets to the first data sink.

When the status detector detects that the switch buffer status condition has dropped below the threshold limit (branch 416) the SBFC transmitter generates a second DLLP (step 418) that is sent to the data source (step 420). The SBFC receiver reads the second SBFC DLLP (step 422), which contains instructions for the data source to resume sending packets destined for the first data sink to the switch (step 424).

Figure 5:
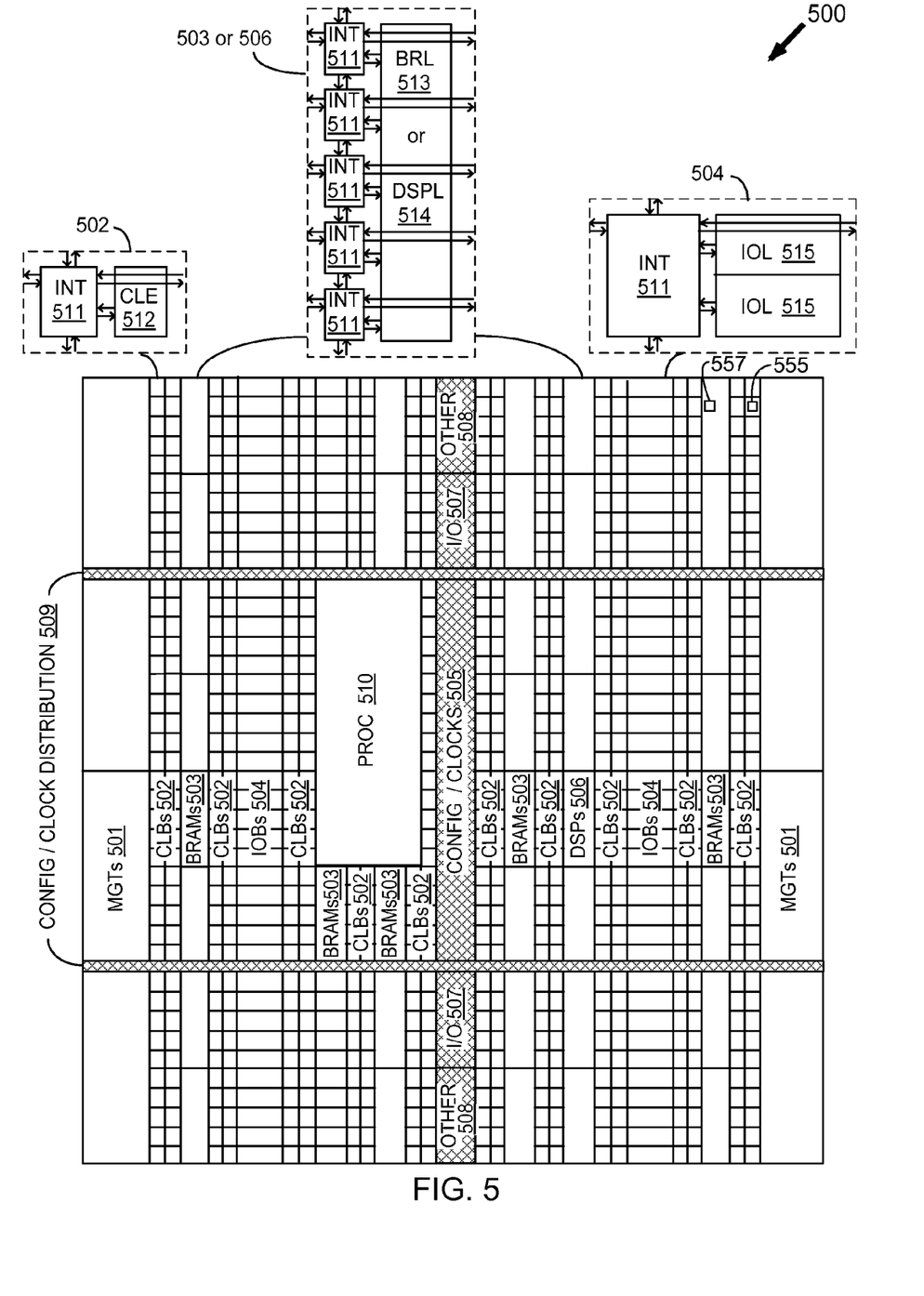
FIG. 5 is a plan view of an FPGA configured according to an embodiment of the present invention.

FIG. 5 is a plan view of an FPGA 500 configured according to an embodiment. The FPGA 500 includes CMOS portions in several of the functional blocks, such as in RAM and logic, and is fabricated using a CMOS fabrication process. The FPGA is configured with an application including a PCIe system that transfers data between components of the FPGA and optionally off-chip components using a SBFC technique. The PCIe system includes at least one switch 555 having a buffer status detector and an SBFC transmitter according to an embodiment and having a data source 557 configured or configurable to provide data to at least two data sinks, the data source having an SBFC receiver for reading DLLPs from the SBFC transmitter to control data flow from the data source to a selected data sink.

The FPGA architecture includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), specialized input/output blocks (I/O 507) (e.g., configuration ports and clock ports), and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element (INT 511) also includes the connections to and from the programmable logic element within the same tile, as shown by the examples included at the top of FIG. 5.

For example, a CLB 502 can include a configurable logic element (CLE 512) that can be programmed to implement user logic plus a single programmable interconnect element (INT 511). A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 506 can include a DSP logic element (DSPL 514) in addition to an appropriate number of programmable interconnect elements. An IOB 504 can include, for example, two instances of an input/output logic element (IOL 515) in addition to one instance of the programmable interconnect element (INT 511). As will be clear to those of skill in the art, the actual I/O pads connected, for example, to the I/O logic element 515 are manufactured using metal layered above the various illustrated logic blocks, and typically are not confined to the area of the input/output logic element 515. In the pictured embodiment, a columnar area near the center of the die (shown shaded in FIG. 5) is used for configuration, clock, and other control logic.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What is claimed is:

1. An integrated circuit ("IC") with a peripheral component serial interconnect system comprising:
a first data sink;
a second data sink;
a data source having a status-based flow control receiver and capable of providing first data packets destined for the first data sink of the interconnect system and capable of providing second data packets destined for the second data sink of the interconnect system;
wherein the first data sink is configured to communicate a credit limit to the data source;
wherein the data source is configured to track credits used in communicating the first data packets to the first data sink and suspend communicating the first data packets to the first data sink in response to reaching the credit limit; and
a switch of the interconnect system having a first buffer queuing the first data packets from the data source, a second buffer queuing the second data packets from the data source, a status detector configured to detect a buffer condition of the first buffer and to produce a first signal when the buffer condition equals or exceeds a selected buffer threshold, and a status-based flow control transmitter configured to send a first data link layer packet ("DLLP") to the status-based flow control receiver of the data source over a status-based flow control feedback path in response to the first signal;
wherein the buffer condition is a quantity of data in the first buffer, the selected buffer threshold is a value that causes the buffer condition to equal or exceed the selected buffer threshold before the credit limit is reached by the data source, and the data source ceases providing the first data packets in response to the first DLLP.

2. The IC of claim 1 wherein the first DLLP received by the status-based flow control receiver comprises an instruction to suspend transmission of first data packets from the data source without affecting transmission of second data packets from the data source.

3. The IC of claim 2 wherein the status detector is further configured to detect a second buffer condition of the first buffer and to produce a second signal when the second buffer condition is less than the selected buffer threshold, the status-based flow control transmitter sending a second DLLP to the status-based flow control receiver of the data source over the status-based flow control feedback path to resume transmission of first data packets.

4. The IC of claim 1 wherein the first buffer queues non-posted first data packets.

5. The IC of claim 1 wherein the status detector is further configured to detect a second buffer condition of a second buffer.

6. The IC of claim 5 wherein the second buffer queues first data packets.

7. The IC of claim 5 wherein the second buffer queues second data packets.

8. The IC of claim 1 wherein the selected buffer threshold is selected so as to initiate the first DLLP before the first data sink and the switch reach a credit limit of a credit-based flow control of the interconnect system.

9. The IC of claim 1 wherein the first data packets are of a first traffic class and the second data packets are of the first traffic class.

10. The IC of claim 1 wherein the switch is configured in a field-programmable gate array ("FPGA").

11. The IC of claim 10 wherein the FPGA is configured according to an application to operate in the interconnect system, and the selected buffer threshold is set after operation of the interconnect system according to a credit limit of a credit-based flow control so as to initiate the first DLLP before the first data sink and the switch reach the credit limit.

12. A method of controlling data flow from a data source in an interconnect system comprising:
  providing first data packets destined for a first data sink from a data source to a switch;
  providing second data packets destined for a second data sink from the data source to the switch;
  communicating a credit limit from the first data sink to the data source;
  tracking by the data source, credits used in communicating the first data packets to the first data sink, and suspending communicating of the first data packets to the first data sink in response to reaching the credit limit;
  monitoring a buffer status condition in the switch, the buffer status condition being related to data flow from the switch to the first data sink;
  generating a first data link layer packet ("DLLP") in the switch when the buffer status condition equals or exceeds a buffer threshold limit, the first DLLP including instructions to cease transmission of first data packets from the data source to the switch;
  wherein the buffer condition is a quantity of data in the first buffer, and the selected buffer threshold is a value that causes the buffer condition to equal or exceed the selected buffer threshold before the credit limit is reached by the data source;
  sending the first DLLP to the data source;
  reading the first DLLP; and
  ceasing to send first data packets from the data source to the switch while continuing to send second data packets from the data source to the switch in response to first DLLP.

13. The method of claim 12 further comprising steps, after ceasing to send first data packets;
  monitoring the buffer status condition;
  generating a second DLLP in the switch when the buffer status condition is less than the buffer threshold limit, the second DLLP including instructions to resume transmission of first data packets from the data source to the switch;
  sending the second DLLP to the data source;
  reading the second DLLP; and
  resuming sending first data packets from the data source to the switch.

14. The method of claim 12 wherein the step of monitoring a buffer status condition includes monitoring a buffer queuing data destined for the first data sink.

15. The method of claim 12 wherein the step of monitoring a buffer status condition includes monitoring a plurality of buffers in the switch, each of the plurality of buffers queuing data destined for the first data sink.

16. The method of claim 12 wherein the step of monitoring a buffer status condition also includes monitoring a buffer queuing data destined for the second data sink.

17. The method of claim 12 wherein the first data packets have a traffic class and the second data packets have the traffic class.

18. The method of claim 12 wherein the interconnect system includes a credit-based flow control system further comprising:
  generating a credit-based flow control DLLP including instructions to cease transmission of first data packets and second data packets from the data source to the switch in the credit-based flow control system, the credit-based flow control DLLP being concurrent with the first DLLP, the first DLLP being sent to the data source before the credit-based flow control DLLP.

19. The method of claim 12 further comprising:
  monitoring a second buffer status condition in the switch, the second buffer status condition being related to data flow from the switch to the second data sink;
  generating a third DLLP in the switch when the second buffer status condition equals or exceeds a second buffer threshold limit;
  sending the third DLLP to the data source;
  reading the third DLLP;
  ceasing to send second data packets from the data source to the switch while continuing to send first data packets from the data source to the switch.

* * * * *